Feb. 16, 1954  B. J. BABBITT  2,668,985
MOLDING APPARATUS
Filed Jan. 4, 1951
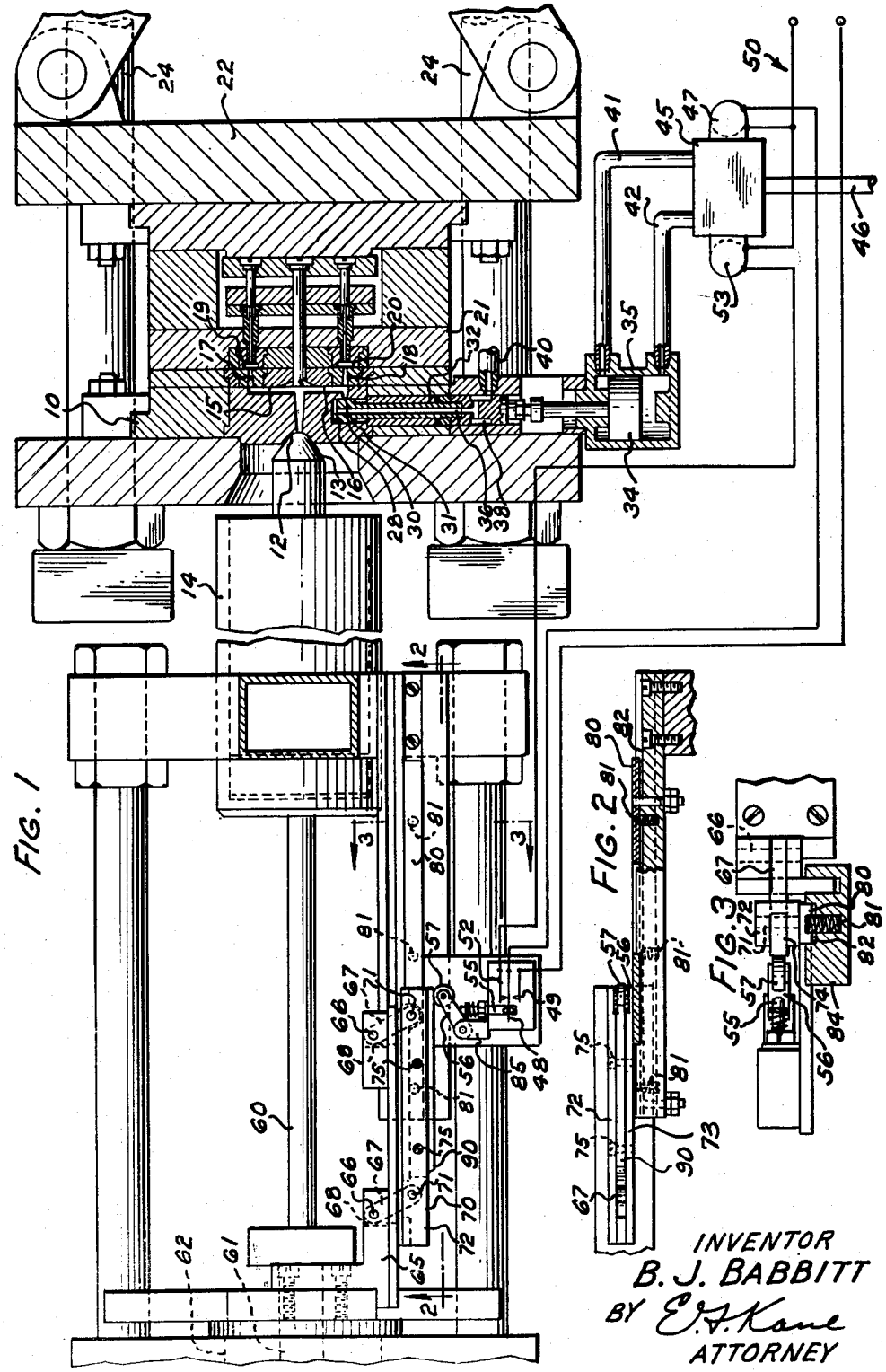
INVENTOR
*B. J. BABBITT*
BY *E. F. Kane*
ATTORNEY Patented Feb. 16, 1954

2,668,985

UNITED STATES PATENT OFFICE 2,668,985

MOLDING APPARATUS

Bethel J. Babbitt, Riverside, Ill., assignor to Western Electric Company, Incorporated, New York, N. Y., a corporation of New York Application January 4, 1951, Serial No. 204,340

6 Claims. (Cl. 18—30)

This invention relates to molding apparatus, and more particularly to devices for evacuating mold cavities prior to filling the mold cavities with molding compound so that air is not entrapped in the molding cavity.

In the manufacture of molded articles having small critical dimensions, it is essential that all the air in the molding cavities be evacuated before the molding cavities are filled with molding compound in order that all portions of the cavities be filled with molding compound. In the past, there has been no apparatus for satisfactorily effecting this result.

An object of the invention is to provide new and improved molding apparatus.

A further object of the invention is to provide new and improved apparatus for evacuating mold cavities prior to the introduction of molding material therein.

Another object of the invention is to provide apparatus for evacuating mold cavities of an injection type mold as molding material is injected along channels leading toward the mold cavities and then stopping the evacuation of the cavities as the molding material approaches the molding cavities.

An apparatus illustrating certain features of the invention may include a mold having a molding cavity therein and a passage through which molding material may be introduced into the molding cavity, means for forcing molding material through the passage into the molding cavity, a suction line connected to one of the mold cavities and the passage in the mold, a valve positioned in the suction line near the juncture of the suction line and the mold, and means responsive to the forcing means for closing the valve as molding material is forced to a point in the mold near the juncture of the suction line and the mold.

A complete understanding of the invention may be obtained from the following detailed description of an apparatus forming a specific embodiment thereof, when read in conjunction with the appended drawings, in which:

Fig. 1 is a fragmentary, partly sectional, top plan view of an apparatus forming a specific embodiment of the invention with portions thereof shown schematically.

Fig. 2 is a vertical, partially sectional view takn along line 2—2 of Fig. 1, and Fig. 3 is a vertical section taken along line 3—3 of Fig. 1.

Referring now in detail to the drawings, there is shown in Fig. 1 an injection-type molding machine which includes a stationary plate 10 having a sprue bushing 12 into which a nozzle 13 of an injection cylinder 14 fits. The plate includes branched runners 15 and 16 and passages 17 and 18 connected to molding cavities 19 and 20, respectively. The molding cavities are formed in a separable mold 21 which is held against the stationary plate 10 by a bolster plate 22 mounted on guide rods 24—24. The plate 10 is provided with a cylindrical bore 28, which is connected by an opening 30 to the runner 16. A collar 31 mounted on a piston rod 32 fits closely but slidably in the bore 28, and may be held in the position shown in Fig. 1 by an air piston 34 mounted in a cylinder 35, in which position the collar closes the opening 30. The piston rod 32 has a passageway 36 formed therethrough leading to an annular groove 38 communicating at all times with a vacuum line 40, on which a vacuum is placed at all times during the operation of the press.

Pipe lines 41 and 42 connect the upper and lower ends, respectively, of the air cylinder 35 to a suitable four-way valve 45 having air under pressure supplied thereto by a pipeline 46 leading to a supply of air under pressure. When a winding of a solenoid 47 is energized upon engagement of a contactor 48 with a contact 49 in a power line 50, the solenoid actuates the valve 45 to a condition in which the pipe line 46 is connected to the pipe line 41 and pipe line 42 is connected to exhaust. This supplies air under pressure to the upper end of the cylinder 35 so that the piston 34 is moved and maintained in a position in which the vacuum line 40 is connected to the opening 30. When the contactor 48 is moved away from the contact 49 and into engagement with a contact 52, a winding of a solenoid 53 is energized by the power line 50 and the winding of the solenoid 47 is deenergized. This actuates the valve 45 to a condition in which the pipe line 46 is connected to the pipe line 42 and the pipe line 41 is connected to exhaust, and the piston 34 is moved from its position shown in Fig. 1 to the upper end of the cylinder 35. This moves the collar 31 into a position closing the opening 30. A spring-pressed plunger 55 connected to a lever arm 56 having a roller 57 normally holds the contactor 48 in engagement with the contact 52. However, when the arm 56 is rotated in a clockwise direction, as viewed in Fig. 1, the contact 48 is moved out of engagement with the contact 52 and into engagement with the contact 49.

A ram 60 connected to a piston rod 61 mounted in a hydraulic cylinder 62 may be moved toward the right, as viewed in Fig. 1, into the heating cylinder 14 to force molding compound through the nozzle 13 into the sprue bushing 12, the runners 15 and 16, the passages 17 and 18 and the molding cavities 19 and 20. As this movement of the ram 60 begins, a carriage 65 fastened rigidly to the ram is moved therewith. Pins 66—66 mounted on the carriage connect the upper ends of links 67—67 to the carriage, which ends of the links extend into deep grooves 68—68 formed in the carriage. The other ends of the links 67—67 are connected to a cam carriage 70 by pins 71—71. The cam carriage 70 includes a pair of plates 72 and 73 to which is secured a cam plate 74. The cam plate 74 is removable from the plates 72 and 73, which are secured together by bolts 75—75.

A brake shoe 80 is urged into braking engagement with the plate 73 by compression springs 81—81, and is mounted in a groove 82 formed in a stationary support 84, which also supports a bracket 85 supporting the switch arm 56 which is pivotally mounted. The springs 81—81 press the brake shoe 80 sufficiently hard against the plate 73 to cause the cam carriage 70 to stay stationary, as the ram is moved toward the right, as viewed in Fig. 1, until the links 67—67 strike the sides of the grooves 68—68. This moves the cam carriage 70 downwardly to move the contactor 48 out of engagement with the contact 52 and into engagement with the contact 49 through the arm 56, he roller 57 and the cam plate 74, which is in engagement with the roller 57. On further movement of the ram 60, the cam carriage 70 is moved therewith against the action of the brake shoe 80, and holds the contactor 48 in engagement with the contact 49 until a lobe 90 of the cam plate 74 moves beyond the roller 57, at which time the plunger 55 moves the contact 48 out of engagement with the contact 49 and into engagement with the contact 52.

*Operation*

The separable mold 21 is closed and moved into close, air tight engagement with the stationary plate 10, and is held in this position. The heating cylinder 14 then is moved into operative engagement with the plate 10. The hydraulic cylinder 62 is actuated to move the ram 60 through the piston 61 toward the right, as viewed in Fig. 1, and the carriage 65 is moved therewith. This moves the upper ends of the links 67—67 toward the right, and the lower ends of the links are held against movement toward the right. The cam carriage 70 is held by the brake shoe 80 against movement toward the right at this time, which swings the links 67—67 to move the cam carriage 70 downwardly. This causes the cam plate 74 to swing the switch arm 56 in a clockwise fashion to move the switch contactor 48 into engagement with the contact 49. This causes deenergization of the solenoid 53 and energization of the solenoid 47 which actuate the valve 45 to supply air under pressure to the upper end of the cylinder 35 and to the lower end thereof. This moves the piston 34 downwardly to move the collar 31 away from the opening 30 to connect the vacuum line 40 to the sprue bushing 12 and the mold cavities 19 and 20. The vacuum line then exhausts the air from these recesses.

As the ram 60 continues to move the cam carriage 70, the cam plate 74 is held in its lowermost position and moved toward the right along the brake shoe 80. This movement of the ram 60 forces the molding material into the sprue 12 cavity and the runners 15 and 16. Just before the molding material approaches the opening 30, the lobe 90 of the cam plate 74 moves out of engagement with the roller 57, and the switch contact 48 is moved out of engagement with the contact 49 into engagement with the contact 52. This causes the solenoid 47 to be deenergized and the solenoid 53 to be energized, and air under pressure is supplied to the lower end of the cylinder 35 and air is exhausted from the upper end thereof. The piston 34 is moved upwardly thereby to move the collar 31 to a position closing the opening 30. The ram 60 continues to move to the right and the molding material completely fills the sprue bushing 12, the runners 15 and 16, the passages 17 and 18 and the mold cavities 19 and 20 which have substantially all the air exhausted therefrom.

After the mold cavities are filled, the pressure is maintained for some time and then the cylinder 62 is actuated to retract the ram 60 and move it to the left, as viewed in Fig. 1. At the start of this movement, the brake shoe 80 holds the cam carriage 70 against movement until the cam carriage 70 is swung into engagement with the carriage 65, in which position the cam plate 74 does not actuate the switch arm 56 so that the piston 31 is kept in its position closing the opening 30. The ram 60 continues to its retracted position, the articles formed in the cavities 19 and 20 are cooled, and the bolster plate 22 is moved away from the stationary plate 10 after which the separable mold 21 is opened and the molded articles are ejected therefrom. The molding compound in the sprue bushing 12, the runners 15 and 16, the passages 17 and 18 and the opening 30 is then removed therefrom, and the operation described hereinabove may be repeated.

The apparatus described hereinabove keeps molding cavities evacuated substantially completely when molding compounds enter the molding cavities, and proper timing as outlined above keeps the evacuating system from getting clogged with molding compound. A cam plate similar to the cam plate 74, but having a lobe of different length from that of the lobe 90 and at a different position along the carriage 70 may be substituted for the cam plate 74 if conditions make this desirable for molding with molds of different types and dimensions.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A molding apparatus, which comprises a mold having a molding cavity therein and a passage through which molding material may be introduced into the molding cavity, a ram for forcing molding material through the passage into the molding cavity, a suction line connected to one of the mold cavities and the passage in the mold, a valve positioned in the suction line at the juncture of the suction line and the mold, one-way actuating means mounted on the ram, and means responsive to the one-way actuating means for closing the valve as molding material is forced to a point in the mold near the valve.

2. A molding apparatus, which comprises a mold having a molding cavity therein, an injection cylinder mounted in communication with the molding cavity, means for forcing plastic material from the injection cylinder into the molding cavity, a pipeline connected to the molding cavity, means for closing the pipeline, means for evacuating the pipeline, the passageway and the molding cavity, and means operable by the material supplying means for actuating the closing means to prevent the flow of molding material into the pipeline as the mold is being filled.

3. The combination with an injection molding machine having an operating ram and separable die halves defining mold cavities, of a vacuum line, valve means located at the mold cavities for connecting the vacuum line to the mold cavities, a switch for operating said valve to connect said vacuum line to the mold cavities, a bar of predetermined length for operating said switch, a pair of parallel links connecting said bar to the ram and movable between a non-operating position and a switch-operating position for movement of the bar with the ram, and resilient means for applying friction to the bar tending to hold it from movement with the ram thereby to render the links effective to shift the bar to switch operating position upon movement of the ram in one direction.

4. The combination with an injection molding machine having an operating ram and separable die halves defining mold cavities, of a vacuum line, valve means for connecting the vacuum line to the mold cavities, a switch for operating said valve to connect said vacuum line to the mold cavities, a bar of predetermined length for operating said switch, pivotal means connecting said bar to the ram for movement of the bar with the ram generally along a predetermined path and permitting lateral movement of the bar between a non-operating position and a switch operating position, a brake shoe extending along the path of movement of the bar, resilient means pressing the shoe against the bar tending to hold it from movement with the ram thereby to render the pivotal means effective to shift the bar to switch operating position upon movement of the ram in one direction and to shift the bar to an inoperative position upon movement of the ram in the other direction.

5. A molding apparatus, which comprises a stationary plate having a distribution passage therein, an injection cylinder designed to engage one side of the stationary plate in communication with the distribution passage, a mold having molding cavities therein designed to engage the other face of the plate having a molding cavity in communication with the distribution passage, said plate having a bore extending from the exterior thereof positioned adjacent to the distribution passage and also having an opening connecting the bore to said passage, a tube mounted slidably in the bore movable between a position closing the opening and one leaving it open, a piston for moving the tube between a position closing the opening between the bore and the passage and a position opening the passageway between the bore and the passage, a cylinder associated with the piston, a suction line connected with the bore and the tubular member, a solenoid operated four-way valve for controlling the actuation of the cylinder, a ram for forcing molding material from the cylinder into the distribution passage and the molding cavity, a switch operable when actuated to actuate the solenoid operated valve to cause the piston to move the sleeve to a position leaving open the opening, a cam for actuating the switch, a pair of parallel links carrying the cam with the ram and permitting movement of the cam between a non-actuating position and switch-actuating position, a brake positioned adjacent to the path of travel of the cam in engagement with the cam for swinging the cam into switch actuating position as the ram is moved in a direction such as to force molding material out of the injection cylinder and for moving the cam to a non-actuating position relative to the switch as the ram is moved in the opposite direction, said cam having a switch actuating lobe of such a length that the switch is actuated only until the molding material approaches the opening between the passage and the die.

6. A molding apparatus, which comprises a mold having a sprue and a molding cavity, an opening connecting one of the cavities and the sprue cavity to the exterior of the mold, an injection cylinder designed to engage the mold for forcing molding material into the molding cavity through the sprue cavity, said mold also having a vacuum line, a solenoid-controlled valve connecting the opening to the vacuum line, a reciprocable ram for forcing molding material from the cylinder into the sprue cavity and molding cavity in the mold when moved in one direction, a switch for actuating the action of the solenoid-controlled valve, a cam for actuating the switch, a pair of parallel links carrying the cam with the ram and permitting movement of the cam between a non-actuating position and a switch-actuating position, a brake positioned adjacent to the path of travel of the cam in engagement with the cam for swinging the cam into switch actuating position as the ram is moved in a direction such as to force molding material out of the injection cylinder and for moving the cam to a non-actuating position relative to the switch as the ram is moved in the opposite direction, said cam being of such length that it is moved out of switch-actuating position as the molding material approaches the opening in the mold.

BETHEL J. BABBITT.

References Cited in the file of this patent

UNITED STATES PATENTS

| Number | Name | Date |
|---|---|---|
| 791,648 | Richards | June 6, 1905 |
| 2,186,331 | Flood et al. | Jan. 9, 1940 |
| 2,304,461 | Knowles | Dec. 8, 1942 |
| 2,348,197 | Ernst et al. | May 9, 1944 |
| 2,391,362 | Strauss | Dec. 18, 1945 |
| 2,396,348 | Sinclair et al. | Mar. 12, 1946 |
| 2,408,285 | Ashbaugh | Sept. 24, 1946 |
| 2,422,809 | Stupakoff et al. | June 24, 1947 |